(12) United States Patent
Duranleau-Hendrickx (10) Patent No.: US 12,055,095 B1
(45) Date of Patent: Aug. 6, 2024

(54) SYSTEM AND METHOD FOR IDENTIFYING BLOCKAGE OF AN AIR INTAKE FOR AN AIRCRAFT PROPULSION SYSTEM

(71) Applicant: Pratt & Whitney Canada Corp., Longueuil (CA)

(72) Inventor: Louis Duranleau-Hendrickx, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/196,704

(22) Filed: May 12, 2023

(51) Int. Cl.
*F02C 7/057* (2006.01)
*B64D 33/02* (2006.01)
*F02C 9/18* (2006.01)

(52) U.S. Cl.
CPC .............. *F02C 7/057* (2013.01); *B64D 33/02* (2013.01); *F02C 9/18* (2013.01); *B64D 2033/022* (2013.01); *F05D 2220/323* (2013.01); *F05D 2260/606* (2013.01); *F05D 2260/607* (2013.01); *F05D 2260/80* (2013.01)

(58) Field of Classification Search
CPC .............. B64D 33/02; B64D 2033/022; B64D 2045/0085; B64D 45/00; F02C 7/04; F02C 7/05; F02C 7/052; F02C 7/055; F02C 7/057; F02C 9/18; F05D 2260/607
See application file for complete search history.

(56) References Cited

U.S. PATENT DOCUMENTS

| 5,448,881 | A | * | 9/1995 | Patterson | ................ F04D 27/02 701/100 |
| 9,666,051 | B2 | * | 5/2017 | Rossotto | ................ B64D 15/20 |
| 9,945,264 | B2 | * | 4/2018 | Wichmann | ................ G05F 1/66 |
| 10,082,243 | B1 | | 9/2018 | Hagshenas | |
| 11,248,525 | B2 | | 2/2022 | Drolet | |
| 11,421,606 | B2 | | 8/2022 | Lamarre | |
| 11,713,692 | B2 | * | 8/2023 | Parsons | ................ G07C 5/006 701/32.9 |
| 2014/0090456 | A1 | * | 4/2014 | Meisner | ................ G01M 15/14 73/112.01 |

(Continued)

FOREIGN PATENT DOCUMENTS

CN 113405805 B 3/2023

*Primary Examiner* — Alain Chau
(74) *Attorney, Agent, or Firm* — Getz Balich LLC (57) ABSTRACT

A propulsion system for an aircraft includes an engine, a plurality of sensors, and a controller. The engine includes an air intake. The plurality of sensors includes an outside air temperature (OAT) sensor and an air intake sensor. The OAT sensor is disposed outside the engine and configured to measure an OAT. The air intake sensor is disposed inside the air intake and configured to measure an air intake temperature ($T_1$). The controller is configured to: calculate an actual charge heating value (CHactual), compare the CHactual to a charge heating threshold value (CHthresh) to identify the CHactual is greater than or less than the CHthresh, identify a presence or an absence of an unusual engine performance condition for the engine, and identify a presence or an absence of a blockage condition of the air intake based on the CHactual greater than the CHthresh and the presence of the unusual engine performance condition.

20 Claims, 4 Drawing Sheets

(56) References Cited

U.S. PATENT DOCUMENTS

| | | | | |
|---|---|---|---|---|
| 2015/0185716 A1* | 7/2015 | Wichmann | ........... | F02C 9/28 |
| | | | | 700/287 |
| 2015/0330310 A1* | 11/2015 | deGaribody | ........... | G01S 17/58 |
| | | | | 702/45 |
| 2016/0035203 A1* | 2/2016 | Rossotto | ........... | G08B 19/02 |
| | | | | 701/36 |
| 2019/0185185 A1* | 6/2019 | Vercillo | ........... | B64F 5/60 |
| 2019/0390564 A1* | 12/2019 | Parsons | ........... | F02C 7/05 |
| 2020/0398993 A1 | 12/2020 | Drolet | | |

* cited by examiner

SYSTEM AND METHOD FOR IDENTIFYING BLOCKAGE OF AN AIR INTAKE FOR AN AIRCRAFT PROPULSION SYSTEM

TECHNICAL FIELD

This disclosure relates generally to air intakes for aircraft propulsion systems and, more particularly, to systems and methods for identifying blockage of an air intake for an aircraft propulsion system.

BACKGROUND OF THE ART

Some propulsion systems for aircraft may include an air intake configured to supply air to an engine of the propulsion system. The air intake may become blocked by ice, protective covers, or other materials and may thereby impact engine power and/or performance. Various systems and methods are known in the art for identifying blockage of an air intake. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propulsion system for an aircraft includes an engine, a plurality of sensors, and a controller. The engine includes an air intake. The plurality of sensors includes an outside air temperature (OAT) sensor and an air intake sensor. The OAT sensor is disposed outside the engine and configured to measure an OAT. The air intake sensor is disposed inside the air intake and configured to measure an air intake temperature ($T_1$). The controller is connected in signal communication with the OAT sensor and the air intake sensor. The controller includes a processor in communication with a non-transitory memory storing instructions, which instructions when executed by the processor, cause the processor to: calculate an actual charge heating value (CHactual) for the air intake using the OAT and the $T_1$, compare the CHactual to a charge heating threshold value (CHthresh) to identify the CHactual is greater than or less than the CHthresh, identify a presence or an absence of an unusual engine performance condition for the engine by comparing a measured relationship between an engine power parameter and an engine operating parameter to a predicted relationship between the engine power parameter and the engine operating parameter, and identify a presence or an absence of a blockage condition of the air intake based on the CHactual greater than the CHthresh and the presence of the unusual engine performance condition.

In any of the aspects or embodiments described above and herein, the instructions, when executed by the processor, may further cause the processor to generate a warning in response to identification of the presence of the blockage condition of the air intake.

In any of the aspects or embodiments described above and herein, the engine may include a compressor section at an outlet of the air intake. The compressor section may include at least one compressor.

In any of the aspects or embodiments described above and herein, the compressor section may include a variable inlet guide vane assembly upstream of the compressor. The variable inlet guide vane assembly may include a plurality of inlet guide vanes. The instructions, when executed by the processor, may further cause the processor to: control a position of the plurality of inlet guide vanes in response to identification of the presence of the blockage condition of the air intake.

In any of the aspects or embodiments described above and herein, the compressor section may include a bleed air system. The bleed air system may include a bleed air supply valve configured to control a flow rate of bleed air from the compressor. The instructions, when executed by the processor, may further cause the processor to: control a position of the bleed air supply valve in response to identification of the presence of the blockage condition of the air intake.

In any of the aspects or embodiments described above and herein, the engine may include a rotational assembly. The rotational assembly may include a shaft and a propeller. The shaft may be configured to drive the propeller for rotation about a rotational axis. The engine power parameter may be a shaft horsepower of the shaft. The engine operating parameter may be a rotation speed of the shaft.

In any of the aspects or embodiments described above and herein, the air intake may include an intake inlet at an upstream end of the air intake. The intake inlet may face an axially forward direction of the propulsion system.

In any of the aspects or embodiments described above and herein, the air intake may include an intake inlet at an upstream end of the air intake. The intake inlet may be radially offset from an axial centerline of the engine.

In any of the aspects or embodiments described above and herein, the instructions, when executed by the processor, may further cause the processor to: identify the absence of the blockage condition of the air intake based on one or both of the CHactual less than the CHthresh or the absence of the unusual engine performance condition.

In any of the aspects or embodiments described above and herein, the CHthresh may include an expected charge heating value (CHexp) for the air intake. The instructions, when executed by the processor, may further cause the processor to: determine the CHexp based on one or both of an ambient condition parameter and an engine condition for the propulsion system.

In any of the aspects or embodiments described above and herein, the ambient condition parameter may include an altitude or an air speed.

In any of the aspects or embodiments described above and herein, the engine operating parameter may include a shaft horsepower, a shaft rotation speed, or an air mass flow rate through the air intake.

In any of the aspects or embodiments described above and herein, the instructions, when executed by the processor, may further cause the processor to exclude identification of the presence or the absence of the blockage condition during a grounded condition of the aircraft.

In any of the aspects or embodiments described above and herein, the instructions, when executed by the processor, may further cause the processor to identify the presence of the blockage condition of the air intake subsequent to execution of a latch timing process by the processor.

In any of the aspects or embodiments described above and herein, the instructions, when executed by the processor, may further cause the processor to identify the presence of the blockage condition of the air intake subsequent to execution of a steady state verification process by the processor.

According to another aspect of the present disclosure, a method for identifying a blockage condition of an air intake for an engine of an aircraft propulsion system is provided. The method includes calculating an actual charge heating value (CHactual) for the air intake using an outside air temperature (OAT) and an air intake temperature ($T_1$) within the air intake, comparing the CHactual to a charge heating threshold value (CHthresh) to identify the CHactual is greater than or less than the CHthresh, identifying a presence or an absence of an unusual engine performance condition for the engine by comparing a measured relationship between an engine power parameter and an engine operating parameter to a predicted relationship between the engine power parameter and the engine operating parameter, and identifying a presence or an absence of a blockage condition of the air intake. Identification of the presence of the blockage condition is based on the CHactual greater than the CHthresh and the presence of the unusual engine performance condition. Identification of the absence of the blockage condition is based on the CHactual less than the CHthresh or the absence of the unusual engine performance condition.

In any of the aspects or embodiments described above and herein, the method may further include generating a warning in response to identification of the presence of the blockage condition of the air intake.

According to another aspect of the present disclosure, a propulsion system for an aircraft includes an air intake, a gas turbine engine, a plurality of sensors, and a controller. The air intake includes an intake inlet and a core outlet. The air intake is configured to direct ambient air from the intake inlet to the core outlet. The gas turbine engine includes a rotational assembly. The rotational assembly includes a bladed turbine rotor, a shaft, a bladed compressor rotor, and a propeller. The shaft is connected to the bladed turbine rotor and the bladed compressor rotor. The bladed turbine rotor is configured to rotate about a rotational axis to drive rotation of the bladed compressor rotor and the propeller via the shaft. The bladed compressor rotor is disposed at the core outlet. The plurality of sensors includes an outside air temperature (OAT) sensor and an air intake sensor. The OAT sensor is configured to measure an OAT. The air intake sensor is disposed inside the air intake and configured to measure an air intake temperature ($T_1$). The controller is connected in signal communication with the OAT sensor and the air intake sensor. The controller includes a processor in communication with a non-transitory memory storing instructions, which instructions when executed by the processor, cause the processor to: calculate an actual charge heating value (CHactual) for the air intake using the OAT and the $T_1$, compare the CHactual to a charge heating threshold value (CHthresh) to identify the CHactual is greater than or less than the CHthresh, identify a presence or an absence of an unusual engine performance condition for the engine by comparing a measured relationship between a power output of the gas turbine engine and an engine operating parameter to a predicted relationship between the power output and the engine operating parameter, and identify a presence or an absence of a blockage condition of the air intake based on the CHactual greater than the CHthresh and the presence of the unusual engine performance condition.

In any of the aspects or embodiments described above and herein, the engine operating parameter may be a shaft rotation speed of the shaft.

In any of the aspects or embodiments described above and herein, the engine operating parameter may be a fuel flow rate of the gas turbine engine.

The present disclosure, and all its aspects, embodiments and advantages associated therewith will become more readily apparent in view of the detailed description provided below, including the accompanying drawings.

DETAILED DESCRIPTION

Figure 1:
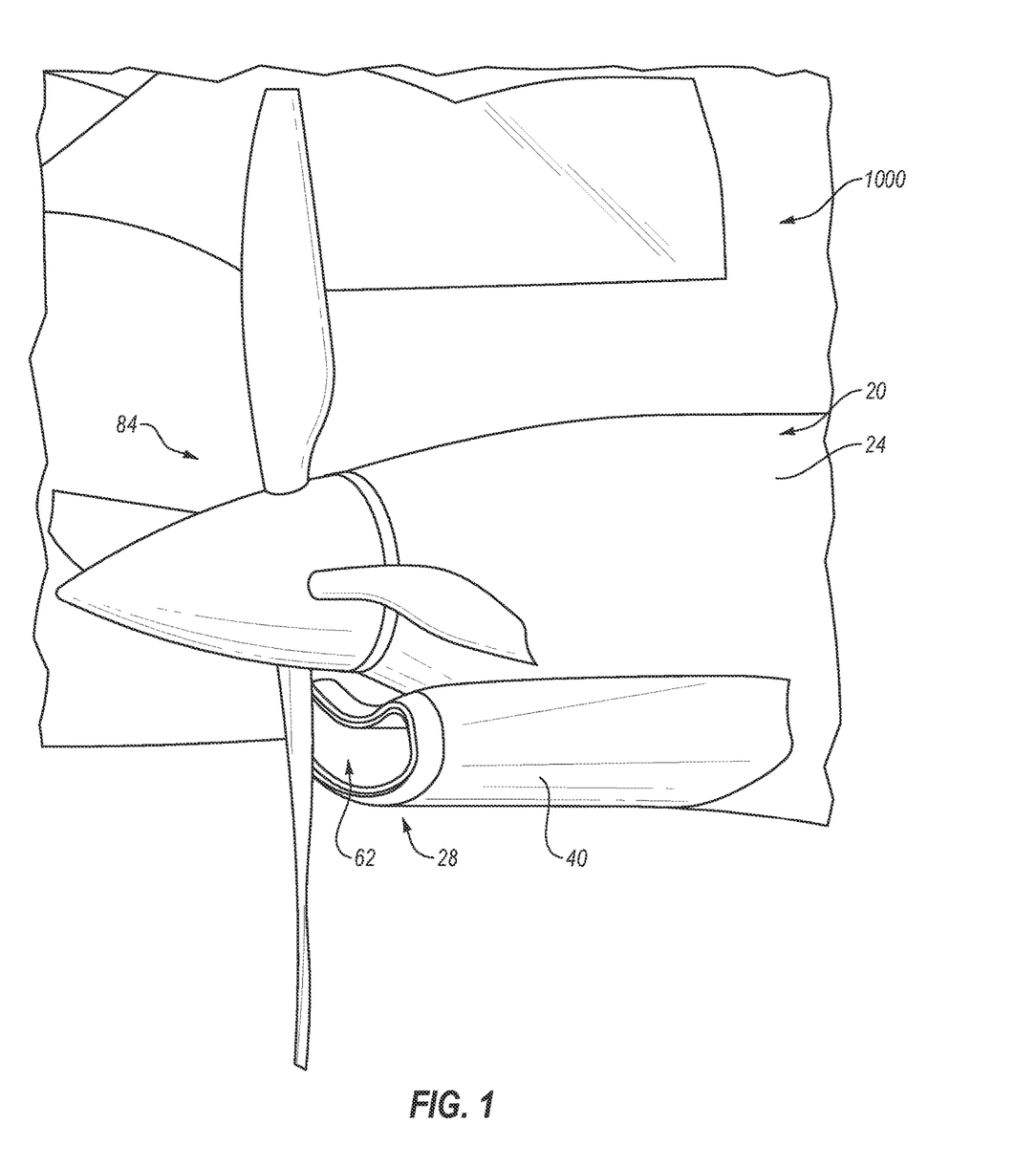
FIG. 1 illustrates a perspective view of a propulsion system for an aircraft, in accordance with one or more embodiments of the present disclosure.
Figure 2:
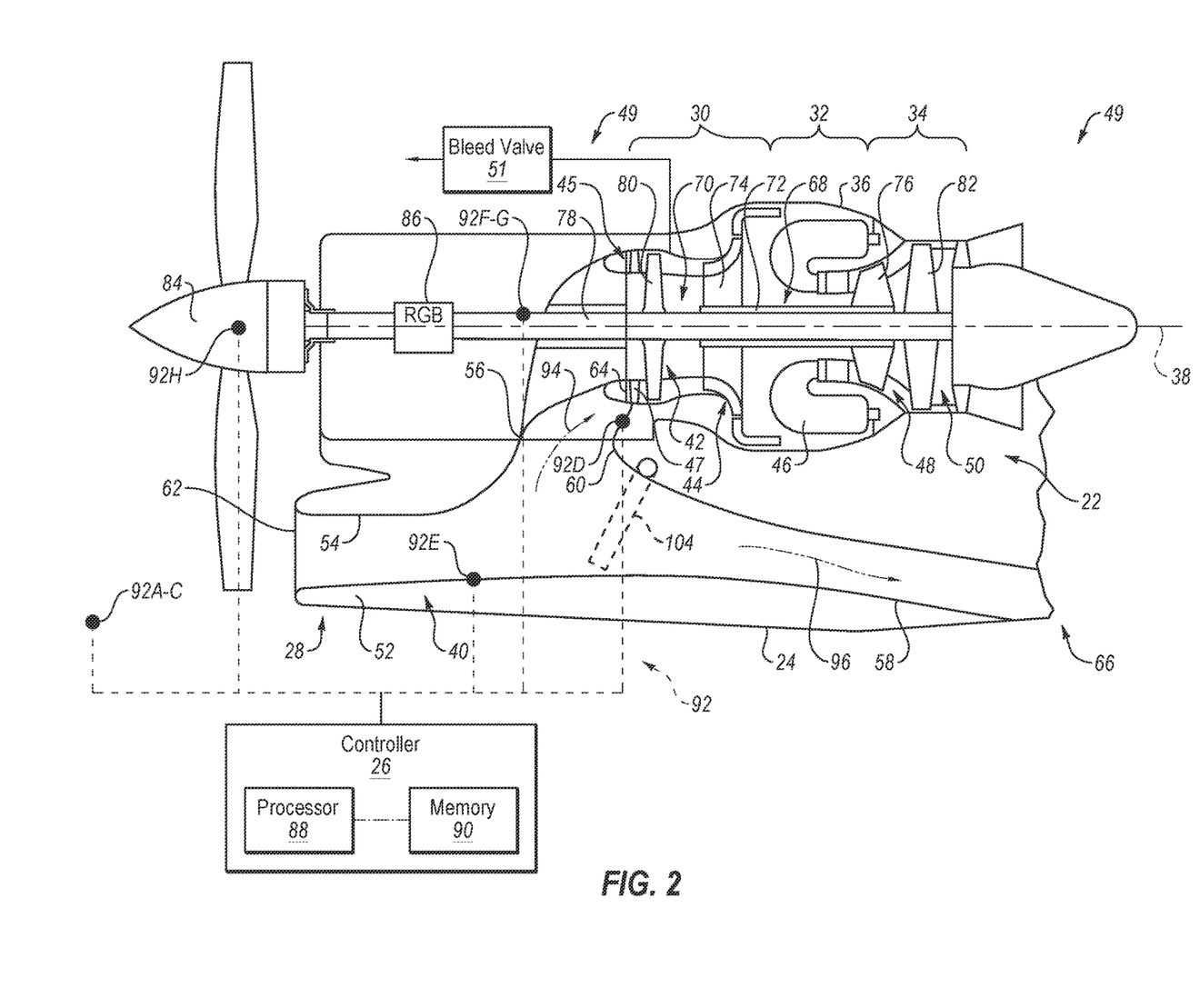
FIG. 2 illustrates a side, cutaway view of the aircraft propulsion system of FIG. 1, in accordance with one or more embodiments of the present disclosure.

FIGS. 1 and 2 illustrate a propulsion system 20 for an aircraft, such as the aircraft 1000 of FIG. 1. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone). The aircraft propulsion system 20 of FIGS. 1 and 2 includes a gas turbine engine 22, a nacelle 24, and a controller 26. However, while the aircraft propulsion system 20 of FIGS. 1 and 2 includes a gas turbine engine, the present disclosure is also applicable to aircraft propulsion systems including a rotary engine, an internal combustion piston engine, a hybrid-electric internal combustion engine, or the like. The propulsion system 20 (e.g., the nacelle 24) may be mounted to or otherwise formed by a portion of the aircraft 1000 such as, but not limited to, a wing or fuselage of the aircraft 1000.

The gas turbine engine 22 of FIGS. 1 and 2 is configured as a turboprop engine. However, the present disclosure is not limited to any particular configuration of gas turbine engine for the propulsion system 20. Examples of gas turbine engine configurations for the propulsion system 20 may include, but are not limited to, a turbofan engine, a turboshaft engine, a turbojet engine, a propfan engine, or the like. The gas turbine engine 22 of FIG. 2 includes an air inlet section 28, a compressor section 30, a combustor section 32, a turbine section 34, and an engine static structure 36.

The gas turbine engine 22 sections 28, 30, 32, and 34 of FIG. 2 are arranged sequentially along an axial centerline 38 (e.g., a rotational axis) of the gas turbine engine 22. The engine static structure 36 may include, for example, one or more engine cases for the gas turbine engine 22. The engine static structure 36 may additionally include cowlings, bearing assemblies, or other structural components of the gas turbine engine 22. The one or more engine cases house and/or structurally support one or more of the engine sections 28, 30, 32, and 34. The engine sections 30, 32, and 34 may be collectively referred to as an "engine core" of the gas turbine engine 22. The air inlet section 28 includes an air intake 40. The compressor section 30 may include a low-pressure compressor (LPC) 42 and a high-pressure compressor (HPC) 44. The compressor section 30 may additionally include a variable inlet guide vane (IGV) assembly 45 disposed upstream of the low-pressure compressor 42. The IGV assembly 45 may include a plurality of inlet guide vanes 47 with each inlet guide vane 47 having a variable position (e.g., angle) for controlling a flow rate and a flow direction of air to the low-pressure compressor 42. The compressor section 30 may additionally include a bleed air system 49. The bleed air system 49 may include at least one bleed air supply valve 51 configured to control a flow rate of bleed air from the compressor section 30 (e.g., from the low-pressure compressor 42 or the high-pressure compressor 44). The bleed air system 49 and its bleed air control valve 51 is configured to direct bleed air for use by one or more fluid systems of the aircraft 1000, the propulsion system 20, and/or the gas turbine engine 22 (e.g., aircraft environmental control systems (ECS), de-icing and/or anti-icing systems, pneumatic control systems, air cooling assemblies, etc.). The combustor section 32 includes a combustor 46 (e.g., an annular combustor). The turbine section 34 may include a high-pressure turbine (HPT) 48 and a low-pressure turbine (LPT) 50.

The air intake 40 is configured to direct a flow of ambient air into the engine core of the gas turbine engine 22. The air intake 40 of FIGS. 1 and 2 includes an intake body 52. The intake body 52 forms a series of air ducts of the air intake 40. The intake body 52 forms an air inlet duct 54, a core flow duct 56, a bypass flow duct 58, and a core-bypass splitter 60 (hereinafter "splitter"). The core-bypass splitter 60 is positioned between the core flow duct 56 and the bypass flow duct 58 to separate and direct air flowing into the core flow duct 56 and the bypass flow duct 58. The air intake 40 of FIGS. 1 and 2 is configured as a "scoop" type air intake. The present disclosure, however, is not limited to any particular air intake configuration, and aspects of the present disclosure may be equally applicable to other air intake configurations such as, but not limited to, a straight inlet configuration (e.g., an inlet configuration without a bypass duct), a submerged inlet configuration, a pitot inlet configuration, a reverse inlet configuration, and a side inlet configuration.

The air inlet duct 54 may be disposed outside of the gas turbine engine 22 and may be formed by, disposed within, or otherwise in contact with the nacelle 24. The air inlet duct 54 includes an intake inlet 62 of the air intake 40. The intake inlet 62 forms an opening at (e.g., on, adjacent, or proximate) an upstream end of the air intake 40. The intake inlet 62 of FIGS. 1 and 2 is radially offset from the axial centerline 38. For example, the intake inlet 62 (e.g., the entire intake inlet 62) may be radially offset from the axial centerline 38. The intake inlet 62 may also be configured with an axial facing orientation. For example, the intake inlet 62 of FIGS. 1 and 2 faces in an axially-forward direction.

The core flow duct 56 includes a core outlet 64 of the air intake 40. The core outlet 64 forms an opening at (e.g., on, adjacent, or proximate) a downstream end of the air intake 40. The core outlet 64 is disposed at (e.g., on, adjacent, or proximate) the compressor section 30 to direct ambient air entering the air intake 40 into the compressor section 30. For example, the core outlet 64 of FIG. 2 is disposed at (e.g., on, adjacent, or proximate) and in fluid communication with an inlet of the low-pressure compressor 42. The core flow duct 56 extends between and to the air inlet duct 54 and the core outlet 64. The core flow duct 56 may extend in a radially inward direction from the air inlet duct 54 to the core outlet 64. The core outlet 64 and portions of the core flow duct 56 may be configured to form an annular portion of the air intake 40 extending circumferentially about (e.g., completely around) the axial centerline 38.

The bypass flow duct 58 includes a bypass outlet 66 of the air intake 40. The bypass outlet 66 forms an opening at (e.g., on, adjacent, or proximate) a downstream end of the air intake 40. The bypass flow duct 58 may be disposed outside of the gas turbine engine 22 and may be formed by, disposed within, or otherwise in contact with the nacelle 24. For example, the bypass outlet 66 may be disposed at (e.g., on, adjacent, or proximate) or otherwise formed through an exterior surface of the nacelle 24 to direct air from the air intake 40 to an exterior of the propulsion system 20. The bypass flow duct 58 extends between and to the air inlet duct 54 and the bypass outlet 66. The bypass flow duct 58 may extend in an axially aft and a radially outward direction from the air inlet duct 54 to the bypass outlet 66. In some embodiments, the bypass flow duct 58 may include a door 104 (e.g., a "bypass door" or an "engine icing" door), an exemplary position of which is schematically illustrated in FIG. 2. The door 104 may be positioned in a closed position during flight, for example, to improve engine performance by directing all or substantially all air entering the intake inlet 62 into the core flow duct 56.

The gas turbine engine 22 sections 30, 32, and 34 of FIG. 2 form a first rotational assembly 68 (e.g., a high-pressure spool) and a second rotational assembly 70 (e.g., a low-pressure spool). The first rotational assembly 68 and the second rotational assembly 70 of FIG. 2 are mounted for rotation about the axial centerline 38 relative to the engine static structure 36. However, rotational assemblies of the gas turbine engine 22 may alternatively rotate about different rotational axes.

The first rotational assembly 68 includes a first shaft 72, a bladed first compressor rotor 74 for the high-pressure compressor 44, and a bladed first turbine rotor 76 for the high-pressure turbine 48. The first shaft 72 interconnects the bladed first compressor rotor 74 and the bladed first turbine rotor 76.

The second rotational assembly 70 includes a second shaft 78, a bladed second compressor rotor 80 for the low-pressure compressor 42, a bladed second turbine rotor 82 for the low-pressure turbine 50, and a rotational load 84. The second shaft 78 interconnects the bladed second compressor rotor 80 and the bladed second turbine rotor 82. The rotational load 84 of FIGS. 1 and 2 is configured as a propeller for providing propulsion (e.g., thrust) for the aircraft 1000. The present disclosure, however, is not limited to the use of a propeller for the rotational load 84. The second shaft 78 of FIG. 2 is connected to the rotational load 84 (e.g., an input shaft of the rotational load 84) by a speed-reducing gear box 86. The speed-reducing gear box 86 is configured to drive the rotational load 84 at a reduced rotational speed relative to the second shaft 78. Alternatively, the second shaft 78 may directly interconnect the rotational load 84 with the bladed second compressor rotor 80 and the bladed second turbine rotor 82.

The nacelle 24 houses the gas turbine engine 22 and forms and aerodynamic cover for the propulsion system 20. The nacelle 24 may extend circumferentially about (e.g., completely around) the axial centerline 38. The nacelle 24 may surround and/or support portions of the air intake 40.

The controller 26 includes a processor 88 connected in signal communication with memory 90. The processor 88 may include any type of computing device, computational circuit, processor(s), CPU, computer, or the like capable of executing a series of instructions that are stored in the memory 90. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the propulsion system 20 to accomplish the same algorithmically and/or by coordination of the propulsion system 20 components. The memory 90 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 26. The controller 26 may include, or may be in communication with, an input device that enables a user to enter data and/or instructions, and may include, or be in communication with, an output device configured, for example to display information (e.g., a visual display or a printer), or to transfer data, etc. Communications between the controller 26 and other electrical and/or electronic components (e.g., controllers, sensors, etc.) may be via a hardwire connection or via a wireless connection. A person of skill in the art will recognize that portions of the controller 26 may assume various forms (e.g., digital signal processor, analog device, etc.) capable of performing the functions described herein.

The controller 26 may form or otherwise be part of an electronic engine controller (EEC) for the propulsion system 20. The EEC may control operating parameters of the gas turbine engine 22 including, but not limited to, fuel flow, stator vane position (e.g., variable compressor inlet guide vane (IGV) position), compressor air bleed valve position, propeller blade pitch, shaft (e.g., first shaft 72 and/or second shaft 78) torque and/or rotation speed, etc. so as to control an engine power and/or thrust of the propulsion system 20. The EEC may modulate fuel flow to the combustor 46 to obtain a desired output power of the gas turbine engine 22. For example, the EEC may modulate the fuel flow using a closed-loop process in which an output power or other operating parameter of the gas turbine engine 22 is measured and fuel flow is increased or decreased as a function of the measured output power or operational parameter. In some embodiments, the EEC may be part of a full authority digital engine control (FADEC) system for the propulsion system 20.

The controller 26 includes or is otherwise connected (e.g., directly or indirectly connected) in signal communication with one or more sensors 92. The sensors 92 may measure and/or provide data (e.g., an electronic output signal) to the controller 26 which is representative of environmental and/or operational parameters and conditions associated with the aircraft 1000, the propulsion system 20, and/or the gas turbine engine 22. The sensors 92 may include, but are not limited to, an outside air temperature (OAT; sometimes referred to as static air temperature (SAT)) sensor 92A, an ambient air pressure sensor 92B, an air speed sensor 92C, an air intake temperature sensor 92D (referred to herein as a "$T_1$ sensor"), an inlet air flow sensor 92E, a shaft torque sensor 92F, a shaft speed sensor 92G, and/or a propeller blade pitch sensor 92H. The sensors 92 may include one or more additional or alternative sensors such as, but not limited to temperature sensors, pressure sensors, accelerometers, torque sensors, and the like to measure and/or provide data to the controller 26 which is representative of environmental and/or operational parameters and conditions associated with the aircraft 1000, the propulsion system 20, and/or the gas turbine engine 22. The OAT sensor 92A is configured to measure a temperature of ambient air surrounding the aircraft 1000 and its propulsion system 20 (e.g., ambient air outside of the air intake 40). The air speed sensor 92C (e.g., a Pitot probe, a Kiel probe, a differential pressure sensor, etc.) is configured to measure an air speed (e.g., a Mach number) for the aircraft 1000. The ambient air pressure sensor 92B, is configured to measure an air pressure of ambient air surrounding the aircraft 1000 and its propulsion system 20. The OAT sensor 92A, the air speed sensor 92C, and the ambient air pressure sensor 92B may be disposed, for example, on a wing or fuselage of the aircraft 1000, however, the present disclose is not limited to any particular location for measurement of OAT. Output signals of the OAT sensor 92A, the air speed sensor 92C, and/or the ambient air pressure sensor 92B may be provided to the controller 26 by an avionics system or other electronic control system of the aircraft 1000. The $T_1$ sensor 92D is positioned within the air intake 40 to measure a temperature of air flow within the air intake 40 (e.g., air flow into the engine core). The $T_1$ sensor 92D of FIG. 2 is at (e.g., on, adjacent, or proximate) the core outlet 64. However, the $T_1$ sensor 92D may be disposed at any position within the air intake 40 (e.g., within the air inlet duct 54 or the core flow duct 56), for example, between the intake inlet 62 and the core outlet 64. The inlet air flow sensor 92E (e.g., a Pitot probe, a Kiel probe, a differential pressure sensor, etc.) is positioned within the air intake 40 to measure an air flow rate within the air intake 40 (e.g., air flow into the engine core). The inlet air flow sensor 92E of FIG. 2 is at (e.g., on, adjacent, or proximate) the core outlet 64. However, the inlet air flow sensor 92E may be disposed at any position within the air intake 40 (e.g., within the air inlet duct 54 or the core flow duct 56), for example, between the intake inlet 62 and the core outlet 64. The shaft torque sensor 92F of FIG. 2 is disposed at (e.g., on, adjacent, or proximate) the second shaft 78 and configured to measure a torque of the second shaft 78. Similarly, the shaft speed sensor 92G is disposed at (e.g., on, adjacent, or proximate) the second shaft 78 and configured to measure a rotational speed of the second shaft 78. For propulsion system 20 configurations including a variable-pitch propeller, the propeller blade pitch sensor 92H may be positioned at (e.g., on, adjacent, or proximate) the propeller (e.g., the rotational load 84 of FIGS. 1 and 2) to measure a pitch of the propeller blades.

During operation of the propulsion system 20 of FIGS. 1 and 2, ambient air enters the propulsion system 20 through the air intake 40 and is directed into a core flow path 94 through the core flow duct 56 and a bypass flow path 96 through the bypass flow duct 58. The core flow path 94 extends axially from the core outlet 64 along the axial centerline 38 within the gas turbine engine 22. More particularly, the core flow path 94 extends axially through the gas turbine engine 22 sections 30, 32, and 34 of FIG. 2. The air within the core flow path 94 may be referred to as "core air." The core air is compressed by the bladed second compressor rotor 80 and the bladed first compressor rotor 74 and directed into a combustion chamber of the combustor 46. Fuel is injected into the combustion chamber and mixed with the compressed core air to form a fuel-air mixture. This fuel-air mixture is ignited and combustion products thereof, which may be referred to as "core combustion gas," flow through and sequentially cause the bladed first turbine rotor 76 and the bladed second turbine rotor 82 to rotate. The rotation of the bladed first turbine rotor 76 and the bladed second turbine rotor 82 respectively drive rotation of the first rotational assembly 68 and the second rotational assembly 70. Rotation of the second rotational assembly 70 further drives rotation of the rotational load 84 to provide propulsion (e.g., thrust) for the aircraft 1000. The bypass flow path 96 extends through the bypass flow duct 58 from the air inlet duct 54 to the bypass outlet 66. The air within the bypass flow path 96 may be referred to as "bypass air."

An aircraft propulsion system (e.g., the propulsion system 20) may experience blockage (e.g., complete or partial obstruction) of an air intake (e.g., the air intake 40). Examples of the cause of such blockage may include, but are not limited to, ice accumulation, foreign objects and/or debris ingested by or otherwise disposed in the air intake 40, or an air intake cover inadvertently left installed (e.g., at the intake inlet 62) for aircraft propulsion system operation. Blockage of an aircraft propulsion system air intake may negatively affect propulsion system (e.g., gas turbine engine) performance, power, efficiency, and/or thrust output due to a reduced flow rate of ambient air into and through the air intake.

Figure 3:
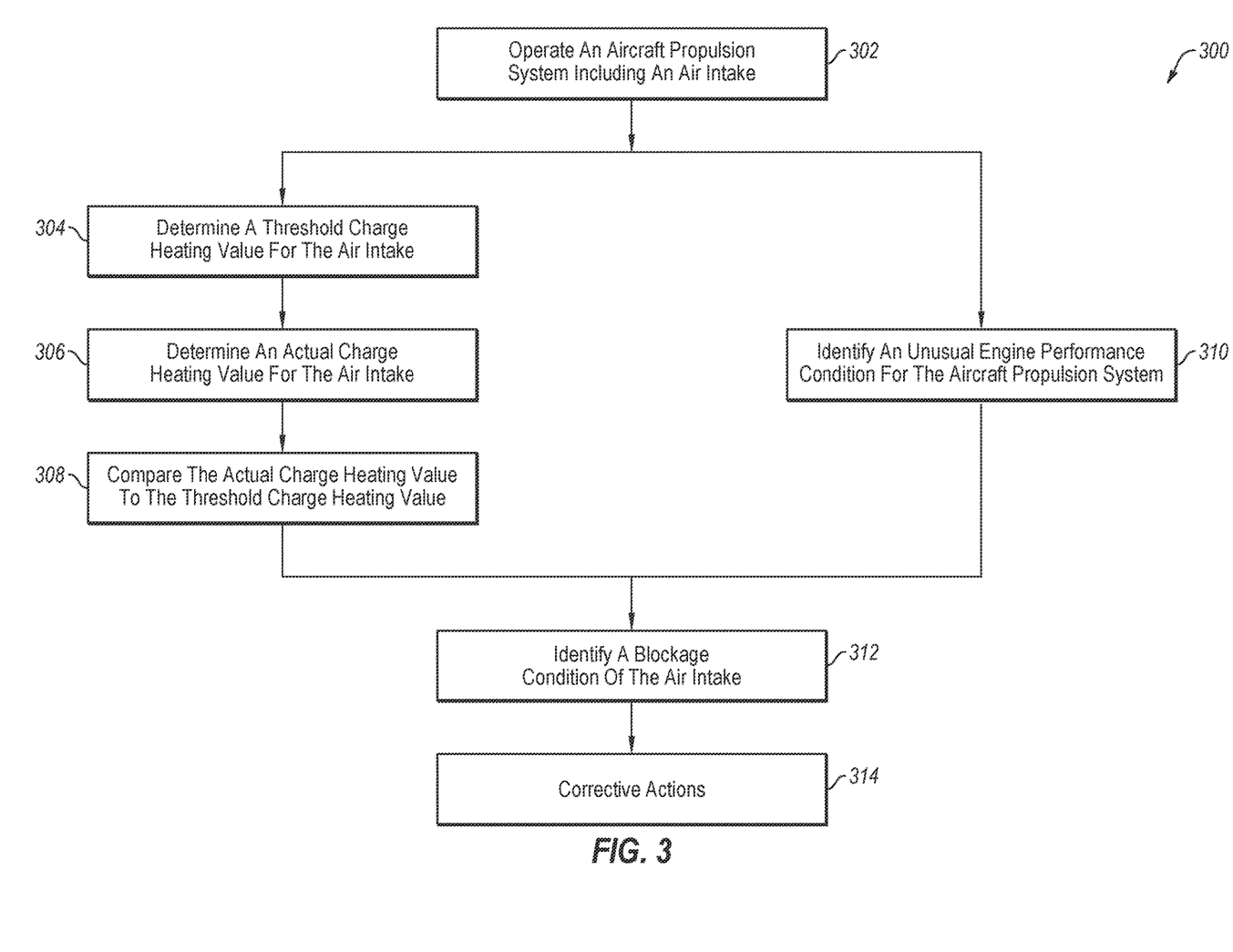
FIG. 3 illustrates a block diagram depicting a method for identifying blockage of an air intake for an aircraft propulsion system, in accordance with one or more embodiments of the present disclosure.

Referring to FIGS. 2 and 3, a Method 300 for identifying blockage of an air inlet for an aircraft propulsion system is provided. FIG. 3 illustrates a flowchart for the Method 300. The Method 300 may be performed for the propulsion system 20, as described herein. The controller 26 may be used to execute or control one or more steps of the Method 300 for the propulsion system 20. For example, the processor 88 may execute instructions stored in memory 90, thereby causing the controller 26 and/or its processor 88 to execute or otherwise control one or more steps of the Method 300. However, it should be understood that the Method 300 is not limited to use with the propulsion system 20, the gas turbine engine 22, and/or the controller 26 described herein. Unless otherwise noted herein, it should be understood that the steps of Method 300 are not required to be performed in the specific sequence in which they are discussed below and, in some embodiments, the steps of Method 300 may be performed separately or simultaneously.

Step 302 includes operating the propulsion system 20 (e.g., the gas turbine engine 22) to provide power (e.g., electrical power, hydraulics, compressor bleed air, etc.) and/or propulsion for the aircraft (see FIG. 1). In particular, the propulsion system 20 may be operated during a flight condition of the aircraft 1000. For example, operation of the gas turbine engine 22 to provide power and/or propulsion for the aircraft 1000 and its propulsion system 20 may be accomplished as described above.

Step 304 includes calculating or otherwise obtaining a threshold charge heating value for the air intake 40. The threshold charge heating value ($CH_{thresh}$) includes an expected charge heating value ($CH_{exp}$) for the air intake 40. The $CH_{thresh}$ may additionally include charge heating margin ($CH_{margin}$). For example, the $CH_{thresh}$ may be equal to the sum of the CHexp and the $CH_{exp}$, $CH_{margin}$.

The $CH_{exp}$ is an expected increase in temperature of ambient air as the ambient air is directed into and through the air intake 40. For example, the $CH_{exp}$ is an expected increase in temperature of the ambient air from the OAT sensor 92A to the $T_1$ sensor 92D. The $CH_{exp}$ may be calculated by the controller 26 using one or more ambient condition parameters and/or engine condition parameters. The ambient condition parameters may be representative of ambient or environmental conditions for the aircraft 1000 and/or its propulsion system 20 which may affect charge heating of air flow through the air intake 40 such as, but not limited to, altitude (e.g., measured or otherwise determined using the ambient air pressure sensor 92B and air speed (e.g., measured or otherwise determined using the air speed sensor 92C). The ambient condition parameters may additionally include aircraft 1000 and/or propulsion system 20 configurations which may affect charge heating of air flow through the air intake 40 such as, but not limited to, an air inlet door position. The engine condition parameters may be representative of gas turbine engine 22 operational conditions which may affect charge heating of air flow through the air intake 40 such as, but not limited to, shaft horsepower (e.g., shaft horsepower of the second shaft 78 measured or otherwise determined using the shaft torque sensor 92F and the shaft speed sensor 92G), shaft rotation speed (e.g., rotation speed of the second shaft 78 measured or otherwise determined using the shaft speed sensor 92G), air mass flow rate through the air intake 40 (e.g., measured or otherwise determined using the $T_1$ sensor 92D and the inlet air flow sensor 92E). The engine condition parameters may be representative of the operation of the gas turbine engine 22 (e.g., the compressor section 30) to draw ambient air flow into and through the air intake 40. The ambient condition parameters and the engine condition parameters may be directly measured, obtained from lookup tables, and/or calculated or modeled using one or more other aircraft and/or propulsion system operational parameters. Similarly, the $CH_{exp}$ may be calculated by the controller 26 obtained from lookup tables and/or calculated or modeled using the ambient condition parameters and/or the engine condition parameters. The $CH_{exp}$ may be calculated by the controller 26 for the particular propulsion system 20 and/or gas turbine engine 22. For example, the $CH_{exp}$ may be calculated using for the particular propulsion system 20 and/or gas turbine engine 22 using initial (e.g., certification) testing for the particular propulsion system 20 and/or gas turbine engine 22. Routine experimentation and/or analysis may be performed by a person of ordinary skill in the art to determine a relationship between $CH_{exp}$ and the ambient condition parameters and/or the engine condition parameters for a particular propulsion system and/or gas turbine engine, in accordance with and as informed by one or more aspects of the present disclosure.

The $CH_{margin}$ may be included in the $CH_{thresh}$, for example, to account for instrument (e.g., sensors 92) error, engine-to-engine variability, aircraft-to-aircraft variability and the like. The $CH_{margin}$ may be a fixed value (e.g., a predetermined value) stored in memory 90. Alternatively, the $CH_{margin}$ may be dynamically determined by the controller 26, for example, using the one or more ambient condition parameters and/or engine condition parameters previously discussed to control a blockage identification sensitivity of the $CH_{thresh}$ based on aircraft 1000, propulsion system 20, and or gas turbine engine 22 operating conditions.

Step 306 includes calculating or otherwise obtaining an actual charge heating value ($CH_{actual}$) for the air intake 40. The $CH_{actual}$ may be calculated by the controller 26 as a difference between the OAT (e.g., measured by the OAT sensor 92A) and a temperature ($T_1$) of the air intake 40 (e.g., measured by the $T_1$ sensor 92D). For example, the $CH_{actual}$ may be equal to $T_1$ minus OAT ($CH_{actual}=T_1-OAT$). As an alternative, the $CH_{actual}$ may be calculated by the controller 26 as a ratio of T1 to OAT. In this case, the $CH_{exp}$, the $CH_{margin}$, and the CHthresh may be similarly modified for a ratio of T1 to OAT.

Step 308 includes comparing the $CH_{actual}$ t to the $CH_{thresh}$ to identify, at least in part, whether a blockage condition of the air intake 40 may be present or absent. The blockage condition of the air intake 40 may be identified, at least in part, by determining whether the $CH_{actual}$ violates the $CH_{thresh}$. For example, the controller 26 may compare the $CH_{actual}$ to the $CH_{thresh}$ to determine whether the $CH_{actual}$ is greater than the $CH_{thresh}$ or the $CH_{actual}$ is less than the CH thresh. A determination that the $CH_{actual}$ is greater than the $CH_{thresh}$ indicates that the $CH_{actual}$ violates the CHthresh and that a blockage condition of the air intake 40 may be present. A determination that the $CH_{actual}$ is less than the $CH_{thresh}$ indicates that the $CH_{actual}$ does not violate the $CH_{thresh}$ and a blockage condition of the air intake 40 may be absent.

Step 310 includes identifying a presence or an absence of an unusual engine performance (e.g., power or efficiency) condition. For example, the controller 26 may identify a presence or an absence of an unusual engine performance condition for the gas turbine engine 22. To identify the presence or the absence of the unusual engine performance condition for the gas turbine engine 22, the controller 26 may compare a measured relationship between an engine power parameter and an engine operating parameter to a predicted relationship between the engine power parameter and the engine operating parameter.

The engine power parameter is representative of a power output of an engine for the propulsion system 20 (e.g., the gas turbine engine 22). Measured values of the engine power parameter may be expressed as a percentage or fraction of a maximum engine power parameter value (e.g., a rated engine power parameter). Examples of engine power parameters may include, but are not limited to, engine power (e.g., shaft horsepower (SHP)), thrust, or shaft torque. The engine power may be measured by multiplying torque by rotation speed, for example, for the second shaft 78 and/or the rotational load 84 (e.g., the propeller).

The engine operating parameter is representative of a functional parameter or a condition of one or more components of an engine for the propulsion system 20 (e.g., the gas turbine engine 22). In particular, the engine operating parameter may be a measured operating parameter of the engine core (e.g., the first rotational assembly 68 or the second rotational assembly 70) of the gas turbine engine 22. Examples of engine operating parameters may include, but are not limited to, shaft rotation speed (e.g., rotation speed of the first shaft 72 or the second shaft 78), fuel flow rate, interstage turbine temperature (ITT) (e.g., a temperature of the core combustion gas between the high-pressure turbine 48 and the low-pressure turbine 50), exhaust gas temperature (EGT), or compressor (e.g., the low-pressure compressor 42 or the high-pressure compressor 44 discharge pressure).

Figure 4:
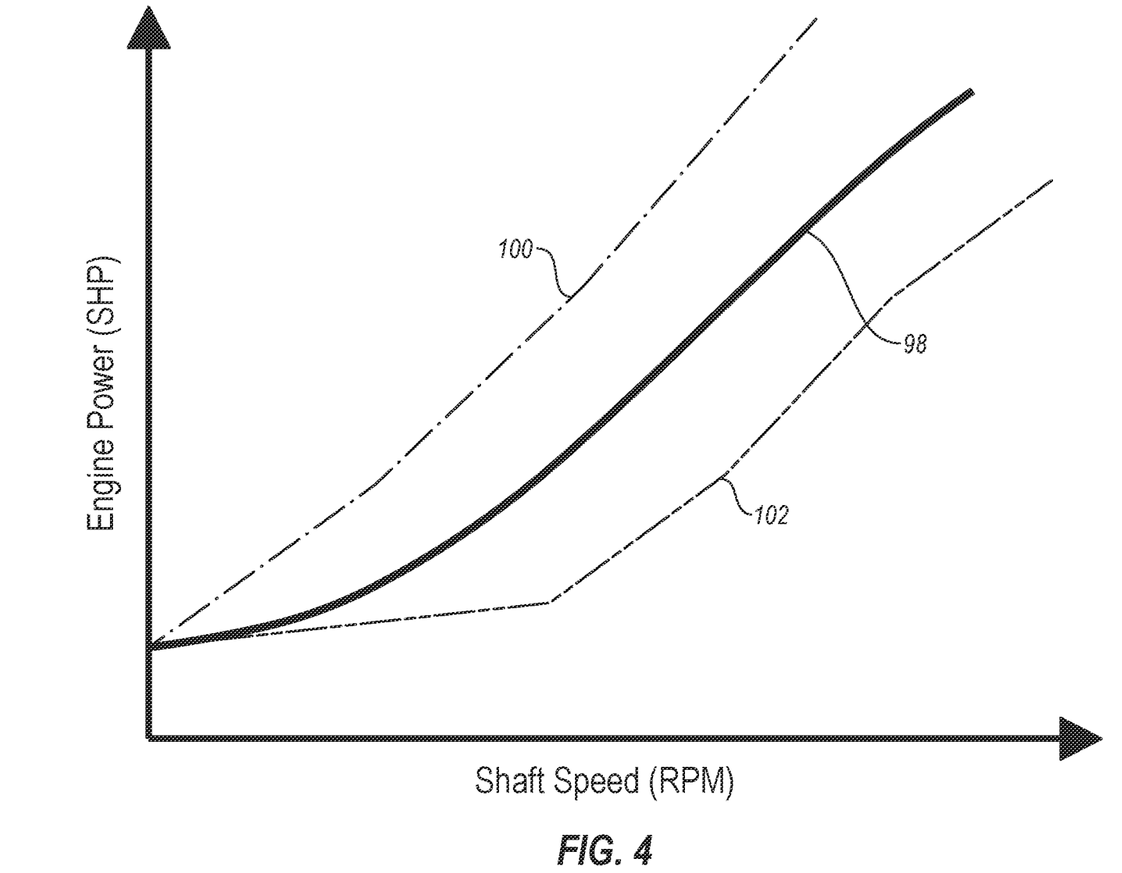
FIG. 4 illustrates an exemplary relationship between an engine power parameter and an engine operating parameter, in accordance with one or more embodiments of the present disclosure.

The predicted relationship between the engine power parameter and the engine operating parameter may be expressed by an expected value of the engine operating parameter for a given value of the engine power parameter. In other words, the expected value of the engine operating parameter may be expressed as a function of the engine power parameter. FIG. 4 illustrates an exemplary predicted relationship between the engine power parameter and the engine operating parameter. In particular, FIG. 4 illustrates an exemplary relationship between an engine power (e.g., an engine power parameter) and a shaft speed (e.g., an engine operating parameter). For example, the engine power may be representative of SHP for the second shaft 78 while the shaft speed may be representative of a rotation speed for the second shaft 78. Of course, the present disclosure is not limited to the particular engine power parameter, engine operating parameter, or relationship between the engine power parameter and the engine operating parameter illustrated in FIG. 4.

FIG. 4 illustrates an expected value curve 98 of the engine operating parameter (e.g., shaft speed) over a range of engine power parameter values. The expected value curve 98 includes expected values of the shaft speed for given values of the engine power. The expected value curve 98 includes a maximum threshold 100 and a minimum threshold 102. The maximum threshold 100 and the minimum threshold 102 may be selected to differentiate between expected values of the engine operating parameter and unexpected (e.g., unusual) values of the engine operating parameter relative to the engine power parameter.

The expected values and thresholds of the engine operating parameter values over the range of engine power parameter values may be determined through experimentation, simulation, or combinations of both. For example, routine experimentation and/or simulation may be performed by a person of ordinary skill in the art to determine a relationship between the engine power parameter and the engine operating parameter for a particular aircraft, propulsion system, and/or engine (e.g., gas turbine engine) in accordance with and as informed by one or more aspects of the present disclosure. The expected values of the engine operating parameter and the engine power parameter may be a function of one or more operation conditions of the particular aircraft, propulsion system, and/or engine such as, but not limited to, altitude, OAT, air speed, or angle of entry of ambient air flow into the air intake. Accordingly, a plurality of expected value curves 98 may be selected, with each expected value curve 98 corresponding to one or more different operating conditions of the particular aircraft, propulsion system, and/or engine. The expected value curve(s) 98 may be represented by predetermined values stored in memory 90. Alternatively, the expected value curve(s) 98 may be dynamically determined (e.g., by the controller 26) based on the one or more operation conditions of the aircraft 1000, the propulsion system 20, and/or the engine (e.g., the gas turbine engine 22). While the predicted relationship between the engine power parameter and the engine operating parameter is described above with respect to an expected value of the engine operating parameter for a given value of the engine power parameter, the predicted relationship may alternatively be expressed as an expected value of the engine power parameter for a given value of the engine operating parameter.

The controller 26 may measure actual values of the engine power parameter and the engine operating parameter, and compare the actual values of the engine power parameter and the engine operating parameter to the predicted relationship between the engine power parameter and the engine operating parameter to identify the presence or the absence the unusual engine performance condition. The controller 26 may receive output signals from the sensors 92 for measurement and/or calculation of the actual values of the engine power parameter and the engine operating parameter. Referring again to the exemplary relationship, illustrated in FIG. 4, between the engine power (e.g., the engine power parameter) and the shaft speed (e.g., the engine operating parameter), the actual engine operating parameter may be compared to the expected value curve 98 for the given value of the actual engine power parameter. The controller 26 may identify the presence of the unusual engine performance condition where the actual engine operating parameter is outside of the thresholds 100, 102 for the given value of the actual engine power parameter. Similarly, the controller 26 may identify the absence of the unusual engine performance condition where the actual engine operating parameter is within the thresholds 100, 102 for the given value of the actual engine power parameter. Again, while identification of the presence or absence of the unusual engine performance condition is described above with respect to comparing the actual engine operating parameter to the expected value curve 98 for the given value of the actual engine power parameter, the identification of the presence or absence of the unusual engine performance condition may alternatively be performed by comparing the actual engine power parameter to the expected value curve 98 for the given value of the actual engine operating parameter.

Step 312 includes identifying (e.g., with the controller 26) a blockage condition of the air intake 40 is present or absent. Identifying the presence of the blockage condition of the air intake 40 includes identifying the $CH_{actual}$ violates the $CH_{thresh}$ (see Step 308) and identifying the presence of the unusual engine performance condition (see Step 310). Identifying the absence of the blockage condition of the air intake 40 includes either (1) identifying the $CH_{actual}$ does not violate the $CH_{thresh}$ (see Step 308) or (2) identifying the absence of the unusual engine performance condition (see Step 310). Identification of the blockage condition of the air intake 40 based on both of the charge heating for the air intake 40 and the engine performance condition may facilitate improved propulsion system 20 reliability by preventing or reducing the likelihood of a false positive blockage condition of the air intake 40. I have observed that temperature sensor (e.g., OAT sensor 92A, T1 sensor 92D) accuracy may drift over time and may present an increased likelihood of false positive (e.g., incorrect) identification of air inlet blockage if only the charge heating is considered. Actions which may be taken by an aircraft pilot and/or control systems of the aircraft or its propulsion system(s) in response to a false positive identification of air inlet blockage may unnecessarily restrict propulsion system performance and/or aircraft operational time. Moreover, evaluation of engine performance conditions alone may not be suitable for identifying a blockage condition of the air inlet, as unusual engine performance conditions may result from many different causes. Accordingly, the present disclosure identification of air intake 40 blockage conditions using charge heating and engine performance conditions may facilitate improved reliability of blockage condition identification while reducing the likelihood of false positives.

Step 312 may include execution of a latch timing process and/or a steady state verification process prior to identifying the presence of the blockage condition for the air intake 40. Identifying the $CH_{actual}$ violates the CHthresh and identifying the presence of the unusual engine performance condition may cause the controller 26 to initiate a latch timing process. For example, the latch timing process may cause the controller 26 to identify the presence of the blockage condition for the air intake 40 only if the controller 26 continues to identify the $CH_{actual}$ violates the $CH_{thresh}$ and the unusual engine performance condition for a consecutive period of time (e.g., 60 seconds). Identifying the $CH_{actual}$ violates the $CH_{thresh}$ and identifying the presence of the unusual engine performance condition may additionally or alternatively cause the controller 26 to initiate a steady state verification process. For example, the steady state verification process may cause the controller 26 to identify the presence of the blockage condition for the air intake 40 only if the controller 26 identifies a steady-state condition of the actual engine power parameter and/or engine operating parameter (e.g., the engine operating parameter does not change by more than X percent (or X units) over a period of Y time). Application of the latch timing process and/or the steady state verification process prior to identifying the blockage condition of the air intake 40 may prevent or facilitate a reduced likelihood of false positives in the identification of the blockage condition, for example, during propulsion system 20 transient operations (e.g., acceleration).

Step 314 may include execution of one or more corrective actions in response to identifying a presence of a blockage condition of the air intake 40. For example, Step 314 may include generating (e.g., with the controller 26) a warning (e.g., an audible alarm, a warning light, a warning message, etc.) for a pilot or other operator of the aircraft 1000 on which the propulsion system 20 is installed. The warning may inform the pilot or other operator that air flow through the air intake 40 may be limited and that propulsion system 20 power and/or performance may be reduced. The warning may inform the pilot or other operator to take one or more actions (e.g., reducing gas turbine engine 22 power). Step 314 may additionally or alternatively include controlling (with the controller 26) one or more components of the gas turbine engine 22 to facilitate increased power and/or performance of the gas turbine engine. For example, the controller 26 may control (e.g., open) variable compressor inlet guide vane (IGV) 51 angles or close compressor bleed air supply valves to maximize the amount of core air available for the engine core. The controller 26 may control a position of the bleed air supply valve 51 to stop or reduce an amount of compressor bleed air supplied to the aircraft 1000, the propulsion system 20, and/or the gas turbine engine 22 to increase available gas turbine engine 22 power. The controller 26 may additionally or alternatively control a position of the door 104 of the bypass flow duct 58 to open the bypass flow duct 58 to allow air to be directed to the core flow duct 56 from the bypass flow duct 58.

In some embodiments, the controller 26 may execute steps of the Method 300 during (e.g., only during) certain operating conditions of the aircraft 1000 or the gas turbine engine 22. T1 to OAT spread may be relatively large during certain operating conditions of the aircraft 1000 or the gas turbine engine 22 and, therefore, may provide limited value for identifying a blockage condition of the air intake 40. In particular, engine starting conditions and grounded conditions of the aircraft 1000 may present relatively high T1 and OAT temperatures due to engine heat soakback from recent engine runs and/or from tarmac heating. Accordingly, the controller 26 may execute steps of the Method 300 only during a flight condition of the aircraft 1000. The controller 26 may exclude certain operating conditions of the gas turbine engine 22 for executing steps of the Method 300. For example, the controller 26 may exclude engine startups (e.g., startup of the gas turbine engine 22).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:
an engine including an air intake;
a plurality of sensors including an outside air temperature (OAT) sensor and an air intake sensor, the OAT sensor is disposed outside the engine and configured to measure an OAT, the air intake sensor is disposed inside the air intake and configured to measure an air intake temperature ($T_1$); and
a controller connected in signal communication with the OAT sensor and the air intake sensor, the controller includes a processor in communication with a non-transitory memory storing instructions, which instructions when executed by the processor, cause the processor to:
calculate an actual charge heating value (CHactual) for the air intake using the OAT and the $T_1$;
compare the CHactual to a charge heating threshold value (CHthresh) to identify the CHactual is greater than or less than the CHthresh;
identify a presence or an absence of an unusual engine performance condition for the engine by comparing a measured relationship between an engine power parameter and an engine operating parameter to a predicted relationship between the engine power parameter and the engine operating parameter; and
identify a presence or an absence of a blockage condition of the air intake, and the presence of the blockage condition of the air intake is identified based on the CHactual greater than the CHthresh and the presence of the unusual engine performance condition.

2. The propulsion system of claim 1, wherein the instructions, when executed by the processor, further cause the processor to generate a warning in response to identification of the presence of the blockage condition of the air intake.

3. The propulsion system of claim 1, wherein the engine includes a compressor section at an outlet of the air intake, and the compressor section includes at least one compressor.

4. The propulsion system of claim 3, wherein the compressor section includes a variable inlet guide vane assembly upstream of the compressor, the variable inlet guide vane assembly includes a plurality of inlet guide vanes, and the instructions, when executed by the processor, further cause the processor to:
control a position of the plurality of inlet guide vanes in response to identification of the presence of the blockage condition of the air intake.

5. The propulsion system of claim 3, wherein the compressor section includes a bleed air system, the bleed air system includes a bleed air supply valve configured to control a flow rate of bleed air from the compressor, and the instructions, when executed by the processor, further cause the processor to:

control a position of the bleed air supply valve in response to identification of the presence of the blockage condition of the air intake.

6. The propulsion system of claim 1, wherein the engine includes a rotational assembly, the rotational assembly includes a shaft and a propeller, the shaft is configured to drive the propeller for rotation about a rotational axis, the engine power parameter is a shaft horsepower of the shaft, and the engine operating parameter is a rotation speed of the shaft.

7. The propulsion system of claim 1, wherein the air intake includes an intake inlet at an upstream end of the air intake, and the intake inlet faces an axially forward direction of the propulsion system.

8. The propulsion system of claim 1, wherein the air intake includes an intake inlet at an upstream end of the air intake, and the intake inlet is radially offset from an axial centerline of the engine.

9. The propulsion system of claim 1, wherein the instructions, when executed by the processor, further cause the processor to:
identify the absence of the blockage condition of the air intake based on one or both of the CHactual less than the CHthresh or the absence of the unusual engine performance condition.

10. The propulsion system of claim 1, wherein the CHthresh includes an expected charge heating value (CHexp) for the air intake, and the instructions, when executed by the processor, further cause the processor to:
determine the CHexp based on one or both of an ambient condition parameter and an engine condition for the propulsion system.

11. The propulsion system of claim 10, wherein the ambient condition parameter includes an altitude or an air speed.

12. The propulsion system of claim 10, wherein the engine operating parameter includes a shaft horsepower, a shaft rotation speed, or an air mass flow rate through the air intake.

13. The propulsion system of claim 1, wherein the instructions, when executed by the processor, further cause the processor to exclude identification of the presence or the absence of the blockage condition during a grounded condition of the aircraft.

14. The propulsion system of claim 1, wherein the instructions, when executed by the processor, further cause the processor to identify the presence of the blockage condition of the air intake subsequent to execution of a latch timing process by the processor.

15. The propulsion system of claim 1, wherein the instructions, when executed by the processor, further cause the processor to identify the presence of the blockage condition of the air intake subsequent to execution of a steady state verification process by the processor.

16. A method for identifying a blockage condition of an air intake for an engine of an aircraft propulsion system, the air intake including an air intake body forming an air inlet duct, a core flow duct, and a bypass flow duct, the core flow duct extending between the air inlet duct and the engine, the bypass flow duct extending between the air inlet duct and a bypass outlet of the air intake, the bypass flow duct including a bypass door, the method comprising:
calculating an actual charge heating value (CHactual) for the air intake using an outside air temperature (OAT) and an air intake temperature ($T_1$) within the air intake;
comparing the CHactual to a charge heating threshold value (CHthresh) to identify the CHactual is greater than or less than the CHthresh;
identifying a presence or an absence of an unusual engine performance condition for the engine by comparing a measured relationship between an engine power parameter and an engine operating parameter to a predicted relationship between the engine power parameter and the engine operating parameter;
identifying a presence of a blockage condition of the air intake based on the CHactual greater than the CHthresh and the presence of the unusual engine performance condition; and
controlling a position of the bypass door to open the bypass flow duct in response to identifying the presence of the blockage condition of the air intake.

17. The method of claim 16, further comprising generating a warning in response to identification of the presence of the blockage condition of the air intake.

18. A propulsion system for an aircraft, the propulsion system comprising:
an air intake including an intake inlet and a core outlet, the air intake is configured to direct ambient air from the intake inlet to the core outlet;
a gas turbine engine including a rotational assembly, the rotational assembly includes a bladed turbine rotor, a shaft, a bladed compressor rotor, and a propeller, the shaft is connected to the bladed turbine rotor and the bladed compressor rotor, the bladed turbine rotor is configured to rotate about a rotational axis to drive rotation of the bladed compressor rotor and the propeller via the shaft, the bladed compressor rotor is disposed at the core outlet;
a plurality of sensors including an outside air temperature (OAT) sensor and an air intake sensor, the OAT sensor configured to measure an OAT, the air intake sensor is disposed inside the air intake and configured to measure an air intake temperature ($T_1$); and
a controller connected in signal communication with the OAT sensor and the air intake sensor, the controller includes a processor in communication with a non-transitory memory storing instructions, which instructions when executed by the processor, cause the processor to:
calculate an actual charge heating value (CHactual) for the air intake using the OAT and the $T_1$;
compare the CHactual to a charge heating threshold value (CHthresh) to identify the CHactual is greater than or less than the CHthresh;
identify a presence or an absence of an unusual engine performance condition for the engine by comparing a measured relationship between a power output of the gas turbine engine and an engine operating parameter to a predicted relationship between the power output and the engine operating parameter; and
identify a presence or an absence of a blockage condition of the air intake, and the presence of the blockage condition of the air intake is identified based on the CHactual greater than the CHthresh and the presence of the unusual engine performance condition.

19. The propulsion system of claim 18, wherein the engine operating parameter is a shaft rotation speed of the shaft.

20. The propulsion system of claim 18, wherein the engine operating parameter is a fuel flow rate of the gas turbine engine.

\* \* \* \* \*